United States Patent [19]
Ohnishi

[11] 3,832,555
[45] Aug. 27, 1974

[54] FLUORESCENCE SPECTROPHOTOMETER
[75] Inventor: Yasushi Ohnishi, Katsuta, Japan
[73] Assignee: Hitachi, Ltd., Tokyo, Japan
[22] Filed: Apr. 10, 1973
[21] Appl. No.: 349,694

[52] U.S. Cl.................. 250/458, 250/461, 356/97
[51] Int. Cl................................................. G01t 4/6
[58] Field of Search.......... 250/458, 459, 461, 372, 250/373; 356/97, 98

[56] References Cited
UNITED STATES PATENTS
3,659,942  5/1972  Vergato............................. 250/339
3,664,743  5/1972  Kanda................................. 356/97

OTHER PUBLICATIONS
A New Concept In Fluorometry, American Instrument Co., Inc., Silver Spring, Md.

*Primary Examiner*—James W. Lawrence
*Assistant Examiner*—Davis L. Willis
*Attorney, Agent, or Firm*—Craig & Antonelli

[57] ABSTRACT

The light emitted from a light source is dispersed and monochromated through the first spectrometer unit and then projected to a fluorescent specimen. The fluorescent light emitted from the specimen is dispersed and monochromated through the second spectromator unit and detected by a detector. Means is provided between the first spectromator unit and the specimen for deriving the light incident to the specimen and supplying the derived light and the dispersed and monochromated fluorescent light alternately to said detector so as to provide an accurate fluorescence spectrum.

26 Claims, 6 Drawing Figures

FLUORESCENCE SPECTROPHOTOMETER

This invention relates to an optical system for a fluorescence spectrophotometer for measuring the fluorescence spectra of fluorescent materials.

Hereinafter, the term "fluorescence" should be interpreted to mean the general photoluminescence including fluorescence and phosphorescence.

A fluorescence spectrophotometer is an apparatus for measuring the excitation and/or emission spectra of a fluorescent material for the purpose of analyzing the measured material qualitatively and/or quantitatively. The optical system for a fluorescence spectrophotometer usually consists of a light source, the first spectrometer (monochromator) unit for dispersing and monochromating the light emitted from the light source and projecting the light to a specimen, a second spectrometer (monochromator) unit for dispersing and monochromating the fluorescent light emitted from the specimen and supplying the light to a detector, and a detector for detecting the intensity of the light incident thereon. An excitation spectrum can be measured by scanning the wavelength of the exciting light (by the first spectrometer unit) and fixing the wavelength of the detected light. An emission spectrum can be measured by fixing the wavelength of the exciting light and scanning the wavelength of the detected fluorescent light (by the second spectrometer unit).

In the conventional fluorescence spectrometer, a beam splitter may be provided after the incident slit of the first spectrometer unit to partially derive the incident light from the source. The light derived in such a manner is detected by a second detector to monitor the fluctuations of the light source. In such a system, however, the fluctuations of the light source cannot be completely compensated by dividing the output of the main detector (measured result) with the output of the second detector. This is partially due to the use of two detectors since the spectral sensitivites of different detectors usually differ from one another. Thus the use of two detectors for the fluorescence measurement and for the monitor of the emission of the light source cannot lead to the complete compensation for the fluctuations of the light source. Further, since the monitoring detector detects white light and the main detector detects monochromatic light, fluctuations in the intensity of the light for the two detectors are not always similar.

Thus, an object of this invention is to provide a fluorescence spectrophotometer which has eliminated the above drawbacks.

Another object of this invention is to provide a fluorescence spectrophotometer of wide applications.

According to a preferred embodiment of this invention, there is provided an optical system for a fluorescence spectrophotometer comprising a light source, the first spectrometer unit for dispersing the light from said light source and irradiating monochromatic light to a specimen, the second spectrometer unit for dispersing the fluorescent light emitted from the specimen, a detector for detecting the light supplied from the second spectrometer unit and means for deriving the light irradiating the specimen at a position between the first spectrometer unit and the specimen and directing the derived light and the fluorescent light dispersed by the second spectrometer unit to said detector aternately.

Other objects, features and advantages of this invention will become apparent from the following detailed description of the preferred embodiments taken in conjunction with the accompanying drawings, in which.

Figure 1:
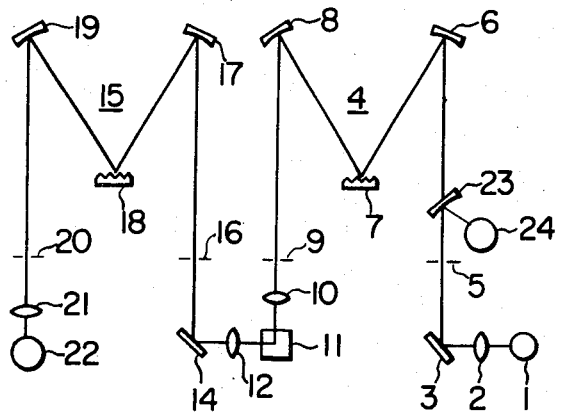
FIG. 1 shows a conventional optical system for a fluorescence spectrophotometer.

First, the prior art technique will be described in connection with FIG. 1. In FIG. 1, light emitted from a light source 1 is focused by a lens 2 onto an incident slit 5 of the first (exciting) spectrometer unit 4 through a reflecting mirror 3. The first spectrometer unit includes an incident slit 5, a collimator 6, a grating 7 as a dispersive element, another collimator 8, and an exit slit 9, and thereby disperses the incident light and project a monochromatic exciting light to a specimen 11 through a focusing lens 10. The irradiated specimen 11 emits fluorescent light (including phosphorescent light) in all the solid angles. A part of these emissions is led into the second (emission side) spectrometer unit 15 through a focusing lens 2 and a mirror 14. The second spectrometer unit includes an incident slit 16, a collimator 17, a grating 18 working as a dispersive element, another collimator 19 and an exit slit 20, similar to the first spectrometer unit 4. Thus, the emission of the specimen 11 led into the second spectrometer unit 15 is dispersed by the grating monochromator 18. The resultant monochromatic light is focused by a focusing lens 21 onto a detector 22 and detected therein.

When the second spectrometer unit is set at a certain wavelength and the first spectrometer is scanned over a desired wavelength region, an excitation spectrum is measured. Alternatively when the first spectrometer unit is set at a certain wavelength and the second spectrometer unit is scanned, an emission (fluorescence) spectrum is measured. A beam splitter 23 is disposed immediately after the incident slit of the first spectrometer unit to partially derive the light from the light source 1 as the monitoring light. The monitoring light is detected in a different detector 24. The outputs of the two detectors 22 and 24 are compared to calibrate the emission intensities thereby to prevent the affect of the fluctuations of the light source for the resultant measurement.

The system of FIG. 1, however, has the following drawbacks.

1. A xenon lamp is usually used as a light source for emitting strong continuum from the ultraviolet to the visible region for a fluorescence spectrophotometer. The xenon lamp is, from its essential nature, unstable. Namely, the position of the bright spot and the intensity of the light varies with time. Therefore, if there exists a difference between the spectral sensitivities of the two detectors, said fluctuations of the light source cannot be compensated fully.

2. The specimen is irradiated with monochromatic light supplied through the first spectrometer unit, whereas the monitoring light is white light. From the experiments carried out by the present invntors, it is found that the effects of the fluctuations of the light source is not the same for such two light beams. Therefore, the effects of the fluctuations of the light source cannot be removed by such monitoring.

Figure 2:
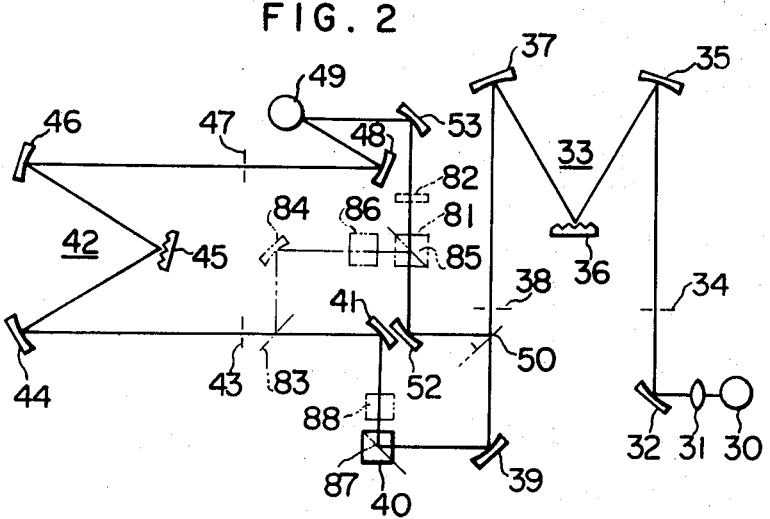
FIG. 2 shows an optical system for a fluorescence spectrophotometer according to an embodiment of this invention.

FIG. 2 shows an embodiment of the optical system for a fluorescent spectrophotometer according to the invention. In the figure, the light emitted from a light source 30 is directed to an incident slit 34 of the first (exciting) spectrometer unit 33 by a lens 31 through a mirror 32. The first spectrometer unit 33 comprises an incident slit 34, collimators 35 and 37, a grating 36 and an exit slit 38. The light introduced into the first spectrometer unit is collimated and directed to the grating monochromator 36 by the collimator 35. A monochromatic light formed by the dispersion by the monochromator 36 is collimated and directed to the exit slit 38 by another collimator 37. The monochromatic light derived from the exit slit 38 is projected to a specimen 40 through a mirror 39. If the photon energy of the monochromatic light is large enough to cause some kind of radiative transition in the specimen, luminescence (fluorescence, phosphorescence) is emitted from the specimen 40 and led into the second (emission) spectrometer unit 42 through a mirror 41. The second spectrometer unit 42 disperses the emission incident on an incident slit 43 and supplies monochromatic light. The second spectrometer unit 42 has a similar structure as that of the first spectrometer unit 33, i.e. it comprises an incident slit 43, collimators 44 and 46, a grating monochromator 45, and an exit slit 47. The monochromatic light from the second spectrometer unit 42 is detected by a detector 49 through a mirror 48. The above structure and the function thereof are similar to those of FIG. 1. Namely an excitation or an emission spectrum is measured by fixing the wavelength of the second or the first spectrometer unit and scanning the wavelength of the first or the second spectrometer unit. Here, the wavelength scanning is easily performed by rotating the grating monochromator 36 or 45.

Figure 3:
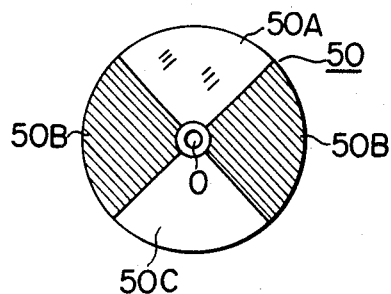
FIG. 3 is a front view of a light chopper used in the optical system of FIG. 2.
Figure 4:
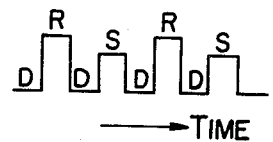
FIG. 4 shows a waveform of the output signal of the detector in the system of FIG. 2.

In the optical system of FIG. 2, an arrangement is also provided to derive the light incident on the specimen 40 between the first spectrometer unit 33 and the specimen 40 in a different direction and lead this light and the exit light from the second spectrometer unit alternately to the detector 49. Namely, a chopper 50 is disposed immediately after the exit slit 38 of the first spectrometer unit 33. This chopper 50 directs the light from the first spectrometer in the direction of the specimen 40 and in a different direction alternately. The light directed in a different direction is led to the detector 49 through the mirrors 52 and 53. The chopper 50 may be of any type and shape provided that it directs the light to the specimen and to a different direction alternately. A typical example of the chopper is shown in FIG. 3, in which a disk comprises a reflecting portion 50A, relfection-free opaque portions 50B and a transparent portion 50C, and is rotative around a shaft O. When this chopper is used as the chopper 50 in FIG. 2, it will be apparent that an electrical signal as shown in FIG. 4 is obtained from the detector 49. In FIG. 4, signals R represent the light when the reflector 50A is located in the optical path and the light is reflected by the reflector 50A, and then by the mirrors 52 and 53 to the detector 49, signals S represent the light when transmitted through the transparent portion 50C, when it is located in the optical path, and finally reflected by the mirror 48 to the detector 49, and signals D represent the light when a reflection-free opaque portion 50B is in the optical path, i.e. the zero level signal since no light is incident on the detector 49.

Hereinbelow, signals R, S and D will be referred to as the reference signal, the specimen signal and the zero level signal, respectively.

As is described above, according to the optical system of FIG. 2, there is provided from the detector 49 a signal such as shown in FIG. 4 including alternating reference and specimen signals R and S with zero level signals intervening therebetween. When the ratio of the specimen signal S to the reference signal R is provided by some means, the afore-mentioned problems (1) and (2) can be completely solved.

First, the present apparatus uses only one detector and thereby there can be no difference in the sensitivity for the measurements of the reference and the specimen signals. Second, the monitoring light is substantially the same as the light irradiated to the specimen.

Further, a semi-transparent mirror (beam splitter) may be disposed in place of the chopper 50 and the beams split thereby may be alternately chopped by a chopper to achieve the similar effects.

Figure 5:
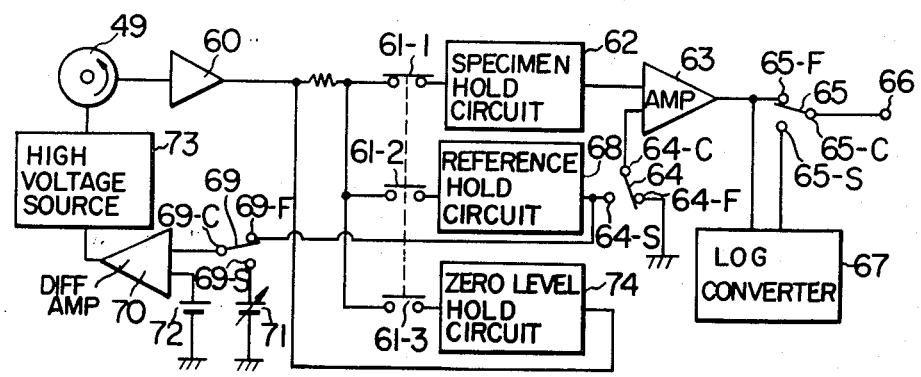
FIG. 5 is a block diagram of an electrical circuit for a fluorescence spectrophotometer to be used in conjunction with the optical system of FIG. 2.

FIG. 5 shows an example of the electrical circuit to be used with the optical system of FIG. 2. In the figure, a detector 49 denotes the detector of FIG. 2 which may be a photomultipher. A pre-amplifier 60, a switch 61-1 and a specimen hold circuit 62 are connected successively to the detector 49. The inputs of a differential amplifier 63 are connected to the output of the specimen hold circuit 62 on one side and to the common contact 64-C of a switch 64 on the other side. In another switch 65, the common contact 65-C is connected to the output terminal 66 and a first contact 65-F is connected to the output of the differential amplifier 63. A log converter 67 has its input connected to the output of the differential amplifier 63 and its output to a second contact 65-S of the switch 65. A first contact 65-F of the switch 64 is grounded and a second contact 64-S is connected through a reference hold circuit 68 and a switch 61-2 to the output of the preamplifier 60. In a switch 69, a first contact 69-F is connected to the output of the reference hold circuit 68, a second contact 69-S to a voltage source 71, and the common contact 69-C to one input of a differential amplifier 70. The other input of the differential amplifier 70 is connected to a standard voltage source 72. The output of the amplifier 70 is connected to the detector 49 through a high voltage source 73. A zero level hold circuit 74 has its input connected to the output of the preamplifier 60 through a switch 61-3 and its output connected directly to the output of the pre-amplifier 60. The switches 61-1, 61-2 and 61-3 are controlled in synchronism with the chopper 50 of FIG. 2. Namely, the switches 61-1, 61-2 and 61-3 are closed only when the transparent portion 50C, the reflective portion 50A and the reflection-free opaque portion 50B are located in the optical path, respectively. Further, although detailed structures are not shown, the hold circuits 62, 68 and 74 are formed of negative feed-back circuits comprising an amplifier and a capacitor connecting the output and the input of the amplifier. These hold circuits integrate the signal introduced to the circuits when the respective input switches 61-1, 61-2, and 61-3 are closed and holes the integrated signal while the respective switches are open. The respective hold circuits work to transform an intermittent signal to a dc signal and the hold circuit 74 works to hold the zero level. Further description of the hold circuit is dispensed with, since the hold circuit itself is a generally well known circuit.

Next, various types of measurement by the optical system of FIG. 2 will be described also referring to the electric circuit of FIG. 5.

RATIO MEASURING MODE

In this mode, the common contacts 64-C, 65-C and 69-C in the switches 64, 65 and 69 are connected to the respective first contacts 64-F, 65-F and 69-F. In this mode, following four measurements are possible.

1. As is described above, according to the optical system of FIG. 2 a signal as shown in FIG. 4 is provided from the detector 49. First, during the period of zero level signal, the switch 61-3 is closed and the switches 61-1 and 61-2 are open. Therefore, the zero level signal is fed back to the output of the pre-amplifier 60 through the route of the preamplifier 60, the switch 61-3 and the zero level hold circuit 74. Even when the switch 61-3 is opened, the zero level signal appearing when the switch was closed is held by the zero level hold circuit 74. Next, during the period of the reference signal appearence, the switch 61-2 is closed and the switches 61-1 and 61-3 are opened. Thus, the reference signal is led to the differential ampifier 70 through the pre-amplifier 60 and the reference hold circuit 68 and compared with the standard voltage signal from the standard voltage source 72 therein so as to activate the high voltage source 73 by the difference signal of said two. Thereby, the output of the detector 49 is kept at a predetermined value irrespective of the wavelength of the light scanned at the moment. The output of the high voltage source is held by the reference hold circuit 68 even when the switch 61-2 is opened. As is apparent from FIG. 4, when the reference signal period is over, another zero level signal period begins. In this period, the switch 61-3 is closed to form the zero level hold circuit again. The zero level signal is held even when the switch 61-3 is opened similar to the preceeding case. Finally, during the specimen signal appearing period, the switch 61-1 is closed and other switches 61-2 and 61-3 are opened. Accordingly, the specimen signal is introduced into the differential amplifier 63 through the pre-amplifier 60 and the specimen hold circuit 62, and compared with the ground voltage signal to provide the difference signal of the two at the output terminal 66.

The above procedures constitute one cycle of the measurement and a multiplicity of such cycles is repeated. Here, it is to be noted that since the high voltage for the detector (photomultiplier) 49 is controlled on the basis of the reference signal to keep the reference signal constant irrespective of the wavelengths and since the specimen signal is formed through the same condition, the specimen signal has been compared with or normalized by the reference signal.

2. A photon meter 81 (generally, rhodamine B solution of a high concentration is used) is disposed between the mirrors 52 and 53 and a cut filter 82 which allows only the fluorescence emitted from the photon meter 81 to pass through is disposed in the following stage. The output signal of the detector 49 due to said fluorescence of the photon meter and the output due to the emission of the specimen are compared similar to the preceeding case (1). Then, a true excitation spectrum can be obtained.

3. A fluorescent reference or standard specimen of a known high concentration is disposed in place of the photon meter 81 and a light shield is disposed in place of the cut filter 82. A semi-transparent mirror 83 is disposed before the incident slit of the second spectrometer unit. Then, a mirror 84 is disposed between the fluorescent specimen of the known concentration and the semi-transparent mirror 83 to direct the fluorescence from the standard fluorescent specimen to said semi-transparent mirror 84. The output signals of the detector 49 due to the emission from the unknown specimen and due to the fluorescence emitted from the known standard specimen are compared in a similar manner to directly measure the concentration of the fluorescent specimen 40 relative to the standard fluorescent specimen of a known high concentration.

4. A mirror 85 is disposed in place of the photon meter 81 and a standard solvent 86 is disposed between the mirrors 84 and 85. The fluorescent specimen 40 is replaced with a mirror 87 and a specimen to be measured 88 is disposed between the mirrors 87 and 41. Thus, a monochromatic light formed by the first spectrometer unit 33 alternately irradiates the solvent 86 and the test specimen 88. The transmissions of the two specimens are further dispersed in the second spectrometer unit 42 and alternately detected by the detector 49. Thus, a signal similar to the signal of FIG. 4 appears at the detector 49 and the two signals are compared in a similar manner to that of the case (1). In this case, this spectrophotometer works as one of the double beam and double monochromator type. Further, if the switch 65 is changed to connect the common contact 65-C with the second contact 65-S, the output signal of the amplifier 63 representing the transmission is converted to a signal representing the optical density by a log converter 67.

DIFFERENCE MEASURING MODE

In this mode, the common contact 65-C of the switch 65 is kept connected with the first contact 65-F, whereas those 64-C and 69-C of the switches 64 and 65 are connected to the second contacts 64-S and 69-S. In this mode, following two measurements are possible.

1. The same fluorescent specimen as the fluorescent specimen 40 is disposed at the position of the photon meter 81 and a filter for deriving a fluorescent light of a particular wavelength among the fluorescence emitted from said fluorescent specimen located at 81 to the detector 49 is disposed at the position of the cut filter 82. The second spectrometer unit 42 is set at a different wavelength to pick up the fluorescence of the different wavelength among those emitted from the specimen 40. Then, the light beams of the two wavelengths are alternately detected by the detector 49 due to the function of the chopper 50. Thus, signals corresponding to the light of the two wavelengths can be derived from the detector 49. The signal for one specimen is led to the differential amplifier 63 through the specimen hold circuit 62 whereas that for the other specimen is led to the differential amplifier 63 through the reference hold circuit 68. In the differential amplifier, the difference signal of the two signals is obtained. In this way, the difference signal of a fluorescent specimen for the two wavelengths can be measured. By this method, the background due to the solvent of the fluorescent specimen can be compensated. In this case, it is provided that the voltages of the voltage source 71 and the standard voltage source 72 are compared in the differential amplifier 70 and a desired high voltage bias is applied from the high voltage source 73 to the detector 49 by said difference signal.

2. Only the solvent of the fluorescent specimen 40 is disposed at the position of the photon meter 81. The semi-transparent mirror 83 and the mirror 84 are disposed at the shown positions. A light shield is disposed at the position of the cut filter 82. Then, the fluorescent light beams emitted from the solvent at the position of 81 and from the fluorescent specimen 40 are introduced through the second spectrometer unit alternately into the detector 49 by the function of the chopper 50. Thus, two signals corresponding to the fluorescent light from the specimen 40 and the solvent at a same wavelength are derived alternately from the detector 49. Thus, when the difference of the two signals is measured similar to said case (1) of two wavelengths measurement, a fluorescent specimen 40 can be analyzed accurately to a low concentration without the effect of the solvent.

SINGLE BEAM TYPE FLUORESCENCE MEASURING MODE

In this mode, the common contact 69-C of the switch 69 is connected to the second contact 69-S and the common contacts 64-C and 65-C of the switches 64 and 65 are connected to the respective first contact 64-F and 65-F. Further, in the optical system of FIG. 2, all the parts shown in dotted lines are removed except the light shield disposed at the position of the cut filter 82. In the period of the zero level signal, the switch 61-1 is open. Further, since the common contact 69-C of the switch 69 is always connected to the second contact 69-S and the common contact 64-C of the switch 64 is always connected to the first contact 64-F, only a predetermined bias voltage is applied to the detector 49 in the zero level period.

When the specimen signal period follows the zero level period, the switch 61-1 is closed and the specimen signal is led to the differential amplifier 63 through preamplifier 60, the switch 61-1 and the specimen hold circuit 62. In the differential amplifier 63, the signal is compared with the ground voltage and the difference of the two appears at the output 66. Thus, a simple single beam fluorescence measurement without any compensating function can be carried out.

Figure 6:
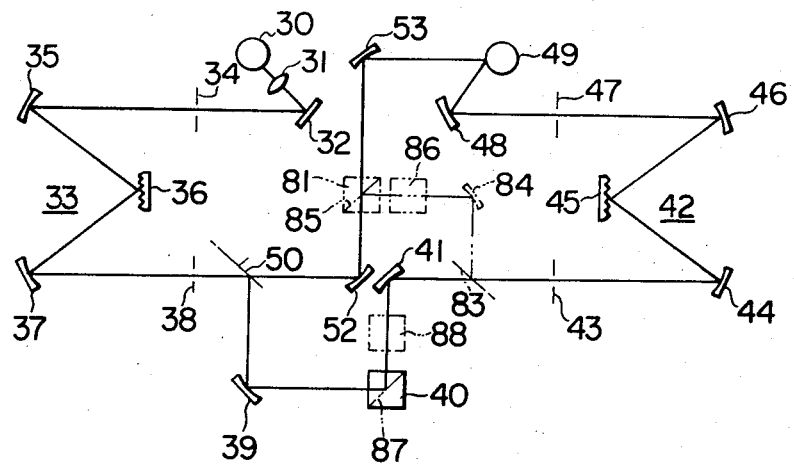
FIG. 6 shows an optical system for a fluorescence spectrophotometer according to another embodiment of the invention.

FIG. 6 shows another embodiment of the optical system for a fluorescence spectrophotometer according to the invention. In the figure, similar numerals denote similar parts as those of FIG. 2. In the optical system of FIG. 2, the light transmitted through the chopper 50 was projected on the specimen 40, whereas the light reflected from the chopper 50 is projected on the specimen, in FIG. 6. The measurement can be done in the completely similar manner as that for the optical system of FIG. 2 and the detailed description is dispensed with.

In the case of using the optical system of FIG. 2 in the double beam double monochromator type, the light of one side is reflected four times by the chopper 50, and the mirrors 52, 85 and 84 between the exit slit 38 of the first monochromator unit 33 and the semi-transparent mirror 83, whereas the light of the other side is reflected three times by the mirrors 39, 87 and 41 in the same region. Thus, there arises an unbalance in the intensities of the two light beams. In the optical system of FIG. 6, the light of one side is reflected three times by the mirrors 52, 85 and 84 and that of the other side is also reflected three times by the mirrors 39, 87 and 41. Thus, the optical system of FIG. 6 does not cause an unbalance for the two light beams when it is used in the double beam double monochromator method.

What is claimed is:

1. A fluorescence spectrophotometer comprising:
    a light source;
    a first monochromator for dispersing the light from said light source;
    first means, disposed in the path of the light dispersed by said first monochromator, for separating the light therefrom along a first path, and selectively into one of a pair of second and third paths;
    second means for disposing a fluorescent specimen, the characteristics of which are to be measured, in said first path, said specimen emitting fluorescent light upon receiving the light dispersed by said first monochromator along said first path;
    a second monochromator for receiving and dispersing the fluorescent light emitted by said specimen;
    a single detector which receives the light dispersed by said second monochromator and converts the received light into a first electrical signal, said signal detector also being disposed to receive light directed along said second path without passing through said second monochromator and to convert it into a second electrical signal, and said single detector being further disposed to receive light directed along said third path which is received by said second monochromator together with the fluorescent light from said specimen; and
    third means for selectively disposing a reference material into one of said second and third paths.

2. A fluorescence spectrophotometer according to claim 1, wherein said reference material is an additional fluorescent specimen.

3. A fluorescence spectrophotometer according to claim 1, wherein said reference material is made of the same material as said fluorescent specimen, the characteristics of said reference material, which are to be measured for said fluorescent specimen, being known.

4. A fluorescence spectrophotometer according to claim 1, wherein said reference material is disposed in said second path.

5. A fluorescence spectrophotometer according to claim 1, wherein said reference material is disposed in said third path.

6. A fluorescence spectrophotometer according to claim 1, further including fourth means, connected to said single detector, for generating an output signal representative of the measured characteristics of said fluorescent specimen relative to a standard.

7. A fluorescence spectrophotometer according to claim 6, wherein said standard is representative of the characteristics of said reference material.

8. A fluorescence spectrophotometer according to claim 6, wherein said fourth means comprises first and second hold circuits;
means for alternately connecting the output of said detector to the inputs of said first and second hold circuits in synchronism with the separation of the light by said first means, said light having been dispersed by said first monochromator, along said first path and one of said second and third paths;
a first differential amplifier having a first input connected to the output of said first hold circuit, and a second input switchably connected to the output of said second hold circuit; and
a second differential amplifier having a first input switchably connected to the output of said second hold circuit, and a second input connected to a standard voltage source, the output of said second differential amplifier being coupled to said single detector.

9. A fluorescence spectrophotometer according to claim 8, wherein said fourth means further comprises an additional voltage source switchably connectable to said first input of said second differential amplifier.

10. A fluorescence spectrophotometer according to claim 9, wherein said additional voltage source is an adjustable voltage source.

11. A fluorescence spectrophotometer according to claim 9, wherein said alternately connecting means is constructed to provide a time interval between the disconnection of one of said hold circuits and the connection of the other of said hold circuits to said single detector.

12. A fluorescence spectrophotometer according to claim 11, wherein said additional voltage is an adjustable voltage source.

13. A fluorescence spectrophotometer according to claim 11, wherein said fourth means further comprises a third hold circuit, the output of which is coupled to the output of said single detector, and the input of which is switchably coupled to the output of said single detector through a resistance means, the input of said third hold circuit being periodically switched to the output of said single detector during said time interval in synchronism with the light separation operation by said first means.

14. A fluorescence spectrophotometer according to claim 13, further comprising a logarithmic converter circuit, the input of which is connected to the output of said first differential amplifier and the output of which is switchably connected to an output terminal from which said generated output signal is taken.

15. A fluorescence spectrophotometer according to claim 8, wherein said alternately connecting means is constructed to provide a time interval between the disconnection of one of said hold circuits and the connection of the other of said hold circuits to said single detector.

16. A fluorescence spectrophotometer according to claim 15, wherein said fourth means further comprises a third hold circuit, the output of which is coupled to the output of said single detector, and the input of which is switchably coupled to the output of said single detector through a resistance means, the input of said third hold circuit being periodically switched to the output of said single detector during said time interval in synchronism with the light separation operation by said first means.

17. A fluorescence spectrophotometer according to claim 16, further comprising a logarithmic converter circuit, the input of which is connected to the output of said first differential amplifier and the output of which is switchably connected to an output terminal from which said generated output signal is taken.

18. A fluorescence spectrophotometer according to claim 15, wherein said first means comprises a light chopper for transmitting the light dispersed by said first monochromator along said first path during a first period of time, and for reflecting the light dispersed by said first monochromator toward one of said second and third paths, during a second period of time subsequent to said first period of time.

19. A fluorescence spectrophotometer according to claim 18, wherein said light chopper is constructed so as to prevent light dispersed by said first monochromator from being directed along any of said first, second and third paths during said time interval, which occurs between said first and second periods of time.

20. A fluorescence spectrophotometer according to claim 8, further comprising a logarithmic converter circuit, the input of which is connected to the output of said first differential amplifier and the output of which is switchably connected to an output terminal from which said generated output signal is taken.

21. A fluorescence spectrophotometer according to claim 8, further including a controllable high voltage source connected between the output of said second differential amplifier and said single detector.

22. A fluorescence spectrophotometer according to claim 1, wherein said first means comprises a light chopper for tranmitting the light dispersed by said first monochromator along said first path during a first period of time, and for reflecting the light dispersed by said first monochromator toward one of said second and third paths, during a second period of time subsequent to said first period of time.

23. A fluorescence spectrophotometer according to claim 22, wherein said light chopper is constructed so as to prevent light dispersed by said first monochromator from being directed along any of said first, second and third paths during a time interval between said first and second periods of time.

24. A fluorescence spectrophotometer according to claim 1, wherein said first means comprises a light chopper for transmitting the light dispersed by said first monochromator toward one of said second and third paths during a first period of time, and for reflecting the light dispersed by said first monochromator along said first path, during a second period of time subsequent to said first period of time.

25. A fluorescence spectrophotometer according to claim 24, wherein said light chopper is constructed so as to prevent light dispersed by said first monochromator from being directed along any of said first, second and third paths during a time interval between said first and second periods of time.

26. An optical system for a fluorescence spectrophotometer comprising:
a light source,
a first spectrometer unit for dispersing the light emitted from the light source and supplying monochromatic light to a fluorescent specimen;
a second spectrometer unit for dispersing the light emitted from the fluorescent specimen;
a single detector for detecting monochromatic light dispersed through said second spectrometer unit; and
means for directing the light incident on the specimen along a different direction, at a position between said first spectrometer unit and said specimen, and alternately supplying the directed light and the light dispersed through the second spectrometer unit to said single detector.

* * * * *